United States Patent [19]

Simmons et al.

[11] Patent Number: 5,236,669
[45] Date of Patent: Aug. 17, 1993

[54] PRESSURE VESSEL

[75] Inventors: Walter J. Simmons, Martinsburg, W. Va.; Edward G. Howard, Jr., Hockessin, Del.

[73] Assignee: E. I. Du Pont de Nemours and Company, Wilmington, Del.

[21] Appl. No.: 880,588

[22] Filed: May 8, 1992

Related U.S. Application Data

[63] Continuation of Ser. No. 580,475, Sep. 12, 1990, abandoned.

[51] Int. Cl.⁵ .................................... G05D 16/00
[52] U.S. Cl. .................................... 422/113; 220/581; 220/582; 422/102; 422/103; 422/242
[58] Field of Search ............ 422/113, 102, 103, 242, 422/292, 295, 296; 220/581, 582, 358, 352, 204

[56] References Cited

U.S. PATENT DOCUMENTS

| | | | |
|---|---|---|---|
| 2,941,246 | 6/1960 | Bundy | 422/242 |
| 3,055,537 | 9/1962 | Watts | 220/46 |
| 3,411,655 | 11/1968 | Gaines | 220/3 |
| 3,782,585 | 1/1974 | Rosenwald et al. | 220/46 |
| 3,933,435 | 1/1976 | Menashi et al. | 422/242 |
| 3,992,912 | 11/1976 | Jonsson | 72/54 |
| 4,108,327 | 8/1978 | Shonerd et al. | 220/3 |
| 4,151,253 | 4/1979 | Waggoner et al. | 422/102 |
| 4,297,323 | 10/1981 | Tetzlaff et al. | 422/242 |
| 4,310,162 | 1/1982 | Donovan | 277/103 |
| 4,325,914 | 4/1982 | Ruyak | 422/102 |
| 4,518,700 | 5/1985 | Stephens | 436/52 |
| 4,563,336 | 1/1986 | McKnight | 422/240 |
| 4,751,058 | 6/1988 | Fuchs, Jr. | 422/240 |

FOREIGN PATENT DOCUMENTS

| | | |
|---|---|---|
| 2832703 | 2/1980 | Fed. Rep. of Germany . |
| 712581 | 1/1980 | U.S.S.R. .................... 220/581 |
| 2139521 | 11/1984 | United Kingdom . |

OTHER PUBLICATIONS

Autoclave Engineers, Inc. literature on pressure vessel 04A-6 (1985).
Autoclave Engineers, Inc. literature on pressure vessel 04A-7 (1985).

*Primary Examiner*—Robert J. Warden
*Assistant Examiner*—Laura E. Collins

[57] ABSTRACT

This invention relates to vessel for high pressure and optionally high temperature processes. More specifically it relates to a pressure vessel having a non-threaded plug, the vessel being useful as a chemical reactor and for polymer processing at high pressures and optionally elevated temperatures.

8 Claims, 2 Drawing Sheets

PRESSURE VESSEL

This is a continuation of application Ser. No. 07/580,475, filed Sep. 12, 1990 now abandoned.

FIELD OF THE INVENTION

This invention relates to a vessel for high pressure processes. More specifically, it relates to a pressure vessel having a non-threaded plug useful as a chemical reactor for chemical reactions including polymerization of gaseous or liquid monomers, and for polymer processing at high pressures and elevated temperatures.

DESCRIPTION OF THE RELATED ART

Various forms of pressure vessels for carrying out chemical reactions and polymer processing are known. Typical high pressure vessels use screw threads to seal the ends. This end closure method includes a large thread which pushes a tapered plug into a mating taper of the pressure vessel. The end plug is in compression and the entire load is transferred to the threads which places the vessel in tension. An "O" ring or other type of seal prevents the vessel from leaking. The end plugs of pressure vessels of the art must not be in interference fit (contact so close as to produce deformation and stress) or removal of said plugs becomes extremely difficult. As the vessel end has both tension load and hoop stress, the maximum pressure is limited to the combined stress level and must not exceed the strength of the vessel.

A typical problem with this type of closure is difficulty in opening and closing the vessel. The threads must be kept clean; any leakage of the seals allows product to enter the thread area which can foul, jam and/or corrode the threads. Tolerances of both the seal area and the threads must be very close to insure proper operation. The cost of machining a pressure vessel with such precision threading is therefore high.

Also with conventional closures, as the pressure inside the vessel increases, the diameter of the vessel increases. The solid plug is in compression and hence cannot expand with the vessel, often leading to leakage at the seal area.

Furthermore, conventional pressure vessels employ either electric heating systems strapped to the vessel, or hot water/oil for heating and cooling. Heating by direct gas flame applied to the outside of the vessel, in principle a more efficient heating method, has not been used in the belief that induced thermal stresses in the vessel wall would be too severe and that rapid heating could cause leakage around the threads.

There is a need for a high pressure vessel capable of being heated rapidly by, for example, direct gas flame, that avoids the problems set forth above.

The present invention provides a low-cost, easily assembled, non-threaded, quick operating pressure vessel operable at pressures in excess of 80,000 psig (552MPa) and at temperatures of up to about 500° C. which can be heated rapidly by externally applied direct gas flame.

SUMMARY OF THE INVENTION

The pressure vessel of the invention comprises:
(i) a tube having an internal cavity accessed through a tapered opening at one or both ends of the tube, the tube wall being of sufficient thickness to withstand the desired pressure and temperature;
(ii) a moveable, cylindrical plug that inserts into said tapered opening;
(iii) one end of said plug being tapered to provide an interference fit with said tapered opening, said end having a cavity which defines a plug wall, the plug wall having a thickness such that it is flexible under the desired pressure and will be forced against said tapered opening as pressure increases;
(iv) force producing means for moving the plug end into and out of the openings, for example, a hydraulic cylinder;
(v) an external frame, to counteract force from said force producing means; and
(vi) means for holding said tube stationary during movement of the plug end, for example, a stripper plate.

The pressure vessel can be heated by application of direct flame from gas burners located adjacent to the tube.

BRIEF DESCRIPTION OF THE DRAWINGS

The invention can be more fully understood from the following detailed description thereof in connection with accompanying drawings which form a part of this application and in which similar reference numerals refer to similar elements in all Figures of the drawings.

DESCRIPTION OF THE INVENTION

Figure 1:
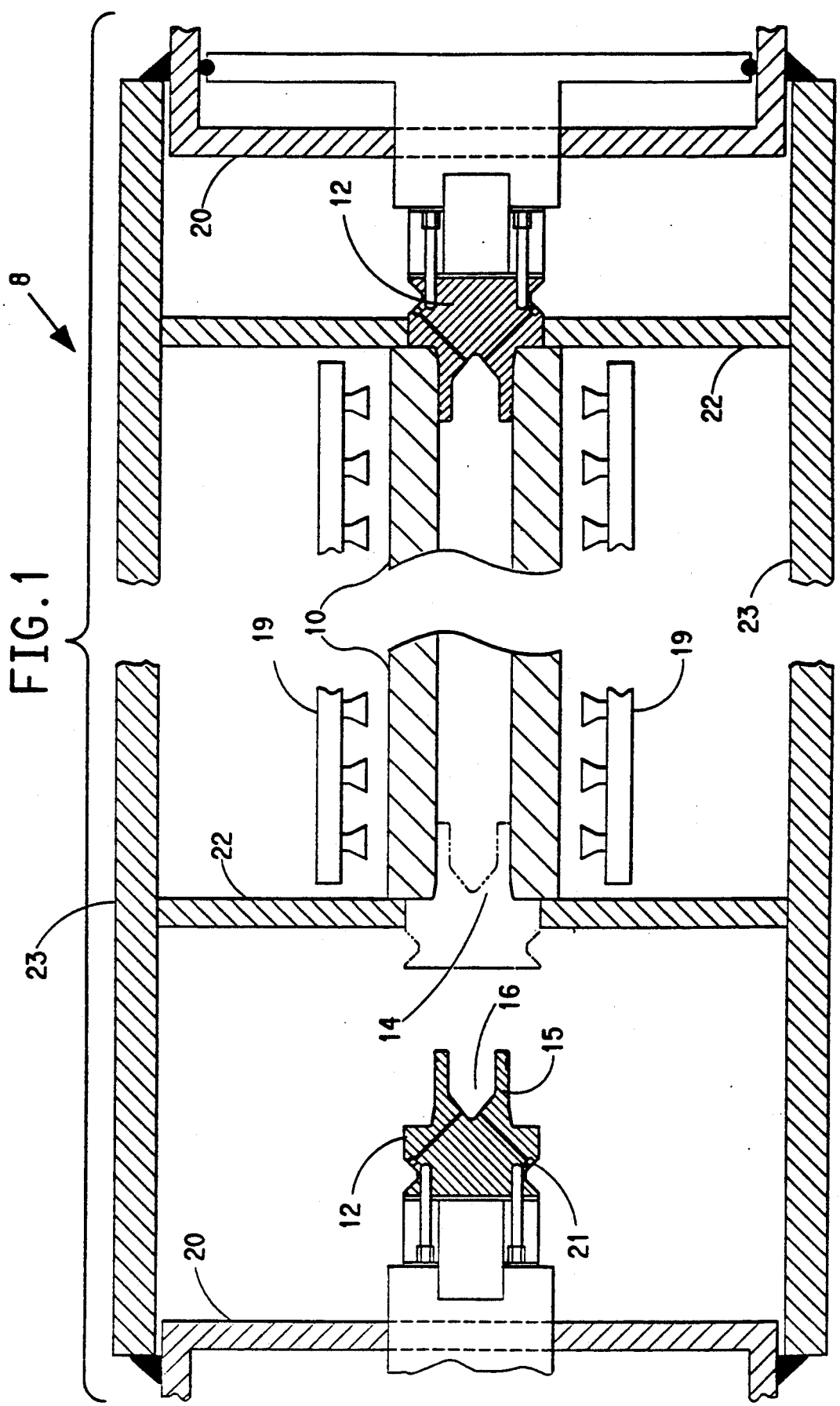
FIG. 1 is a schematic sectional view of the pressure vessel showing at one end a plug in both the "in" and "out" positions.

The pressure vessel of the invention can withstand pressures in excess of 80,000 psig (552MPa). All threads, typically present in conventional pressure vessels, have been eliminated from the present vessel, with the attendant advantage that axial stresses are also eliminated. Thus, the tubular walls of the pressure vessel can be thinner and of lower strength than would otherwise be required. A slight taper in both the plug and in the opening in the end of the tube create an interference fit which eliminates the need for precision machining. With this design the vessel is self-sealing; as the pressure is increased, the plug wall is forced more tightly into the thick wall of the tubular vessel.

Preferably, the invention utilizes two end plugs which facilitate ease of use and cleaning. The cost of fabricating the vessel of the invention is reduced by eliminating precision machining. Standard conventional tubing may be used to construct the tubular vessel, said tubing being of lower cost than machining solid metal to form the vessel. As the high cost of threading two ends is avoided in this invention, the advantages of a double-ended vessel can be realized inexpensively.

Removal and insertion of the plugs is facilitated by the use of a hydraulic cylinder. A benefit of using a hydraulic cylinder to hold the plugs in place is that the hydraulic pressure of the hydraulic cylinder can determine the maximum pressure possible in the pressure vessel. A relief valve can be employed in the hydraulic cylinder circuits so that, should the vessel pressure become too high, the plug will move out of the tube, thus relieving pressure and avoiding vessel rupture.

If desired, the pressure vessel of the invention can utilize a pivoting tube which can be moved clear of obstructions to facilitate easy access for loading and unloading. Using a pivoting tube and hydraulic cylinder, loading or unloading can be completed within 5 minutes, compared with a conventional pressure vessel requiring at least 30 minutes. The hydraulic cylinder can move the hollow plug from the full "in" position to the "out" position very quickly; speed of movement is limited only by the flow of hydraulic fluid into and out of the hydraulic cylinder. Typically, the plug can be inserted into the tube in under one minute.

The present pressure vessel can be heated by direct, externally applied gas flame. Direct flame provides good heat transfer and thus heats quickly, reducing the time required to attain high temperatures in the pressure vessel. As the gas burners are several inches from the vessel, the vessel can be cooled quickly in an air or water stream. Use of electric heat requires the heating elements to be in direct contact with the vessel, thus insulating the vessel and greatly increasing cooling time. With hot water or oil, quick heating and cooling is possible, but the vessel must be completely jacketed which is expensive. Direct gas flame heating provides all of the advantages of jacketed heating systems without the complexity or cost. It also overcomes the temperature limitations of hot water or hot oil systems.

The pressure vessel should be fabricated from materials selected according to the pressures, temperatures and chemical corrosivity to be encountered during use. For corrosive chemical environments, suitable materials include Hastaloy, titanium or stainless steel. Such materials may be employed at pressures up to about 80,000 psig (552MPa) and temperatures up to about 500° C. For non-corrosive environments, less expensive materials may be suitable, including mild steel for medium pressures not exceeding about 20,000 psig (138MPa), or the so-called high strength steels, for example, 4142H or 4340 steels, for pressures exceeding about 20,000 psig (138MPa).

The thickness and material of construction of the pressure vessel are determined by the anticipated pressure, temperature and corrosivity to be encountered in a given application. The maximum stress in the vessel should be kept below the minimum yield stress of the material selected. For example, using a 4140 steel quenched and tempered at 950° F. (510° C.), the yield strength at 400° F. (204° C.) is 150,000 psig (1035MPa). This material would be suitable for most applications where corrosion is not serious. A vessel having a 4 in. (10.2 cm) bore and 10 in. (25.4 cm) outer diameter can withstand an internal pressure of 100,000 psig (690MPa) at 400° F. (204° C.).

The pressure inside the vessel when 4140 steel is employed is limited to that which would induce a 150,000 psig (1035MPa) stress in the vessel wall. The stress in the vessel wall can be readily calculated as described in reference publications such as, for example, Marks Handbook ISBN 0-07-004127-X, Section 5, pages 49-51, or ASME Boiler and Pressure Vessel Code Section VIII.

Under limited circumstances, internal pressures which result in stresses exceeding the yield strength of the pressure vessel can be employed since the internal plug will yield with the pressure vessel, thus maintaining the seal between the plug and pressure vessel.

FIG. 1 shows a pressure vessel of the present invention designated generally herein by the reference character 8. As shown, the pressure vessel 8 includes a tube or pipe 10 having an internal cavity and a moveable, cylindrical plug 12 at one end of tube 10, preferably at both ends. Tube 10 is made of suitable materials, preferably thick walled standard mechanical tubing and includes an opening 14 at one, preferably both ends. The thickness of the tubing will be sufficient to withstand the desired operating pressures and temperatures. The opening 14 is tapered for self alignment of the plug 12 with tube 10. A large lead 9 in this taper is found immediately adjacent to the opening 14 which narrows to a 0.1° to 5° taper 11 to insure that when the plug 12 is inserted, there will be a metal to metal interference fit between plug 12 and tube 10.

Figure 2:
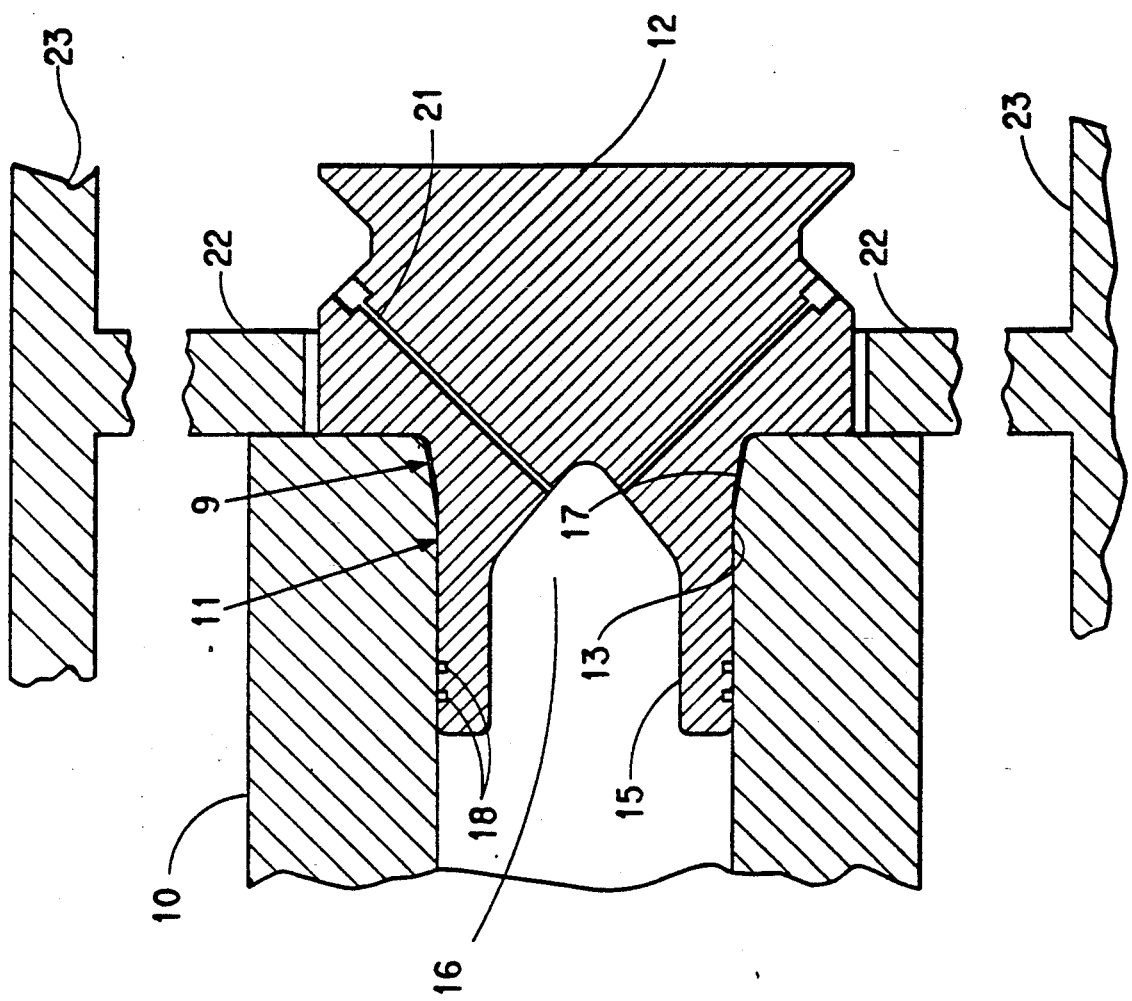
FIG. 2 is an enlarged schematic sectional view of an inserted plug in accordance with the invention.

FIG. 2 shows an enlarged schematic view of the moveable, non-threaded, cylindrical plug 12 used to seal an end of the tube 10. Said plug 12 has a cavity 16 at one end which defines the plug wall 15. The other plug wall also has a slight taper 13 near its opening which matches the taper in the inside diameter of the tube 10. These tapers form an interference fit between the plug 12 and the tube 10. A taper of 0.1° to 5° insures that the plug 12 will lock itself into the tube 10. If the taper is too large, the plug 12 will tend to release itself from the tube 10. As the pressure inside the vessel 8 increases and tube 10 expands in diameter, plug 12 expands with it, thus insuring a tight metal to metal seal at all operating pressures.

It is important that the plug wall 15 be thin enough such that, when it is pressed into the thick walled tube 10, it conforms to any "out of roundness" of either the tube 10 or the plug 12. Both may always be slightly "out of round" due to imperfections in machining, typically by about 0.002 to 0.004 inches (0.005 to 0.01 cm). Thus, an interference fit of 0.005 inches (0.013 cm) can usefully be employed. However, this is not critical and an interference fit ranging from 0.002 to 0.02 inches (0.005 to 0.05 cm) can be used.

The wall thickness of the plug 12 increases gradually at a moderate distance from the seal area. This insures that the plug 12 will not yield in the area near the end of the vessel, or plastically fail in the area where it is not supported by the tube 10. It also reduces the stress in the tube 10 near is end where stress concentrations could cause failure. An undercut area 17 adjacent to the seal area insures that the seal area is fully loaded.

"O" ring grooves 18 on the plug wall 15 are provided to permit use of "O" rings to seal small imperfections in the metal of the plug 12 or tube 10 at low pressures during initial application of pressure. Suitable "O" rings may be fabricated of Teflon ® TFE or FEP fluorocarbon resin, Kalrez ® perfluoroelastomer, neoprene or natural or synthetic rubber, depending on the pressures and temperatures to be employed.

The tube 10 is suspended between a steel support frame 23. Said steel support frame 23 is sufficiently strong to hold the axial load on the plugs 12 produced by the internal pressure. As the end loads are not transmitted to the end of the tube, the only load on the tube is hoop stress. Thus, higher pressures can be obtained with the present design than with the conventional pressure vessel wherein threads are used to hold the end loads.

FIG. 1 further illustrates a means of external force such as the hydraulic cylinder 20 to provide the force required to insert the end plugs 12 and to overcome the force from internal pressures in the vessel. The hydraulic cylinder 20 must have sufficient thrust to hold the plug 12 in position when maximum pressures are obtained in tube 10, and have sufficient retraction force to remove plug 12 from tube 10 when desired. Typical forces for a vessel 8 having a 4 inch (10.2 cm) bore are 50,000 lbs (222 kN) at atmospheric pressure in insert and retract the plug 12, and 1,000,000 lbs (4,450 kN) at 80,000 psig (552MPa) to hold plug 12 in place against pressure. A stripper plate 22 is required to hold the tube 10 stationary when the plug 12 is retracted.

The desired high pressure within the internal cavity of the vessel can be obtained by conventional means. For example, a fluid such as water can be introduced at the desired pressure into said cavity through a suitable inlet means 21. The vessel may be converted to continuous operation by providing an outlet means similar to inlet means 21 in plug 12 at the opposite end of tube 10. It should be understood that inlets 21 are not limited to the introduction and removal of pressure producing fluid. They can also be used to introduce fluid reactants, catalysts, solvents, etc., and remove fluid products. The number of inlets 21 is not limited to one on each end and in many embodiments multiple inlets will be employed.

For easy access in loading and unloading material to and from tube 10, said tube 10 may be pivoted (not shown). Pivoting permits one end of tube 10 to be moved clear of the support frame 23, hydraulic cylinder 20 and plug 12.

The pressure vessel is heated by line gas burners 19 which direct "lines" of flame along tube 10. The amount of heat can be controlled by adjusting the gas pressure and by varying the number of gas burners around the circumference of tube 10.

The pressure vessel 8 can be cooled by water spray or high velocity air impinging directly on to the vessel.

The pressure vessel of the invention may be loaded by fully removing plug 12 from one end of tube 10, the other end of tube 10 remaining closed. The open end is lifted vertically until said open end is clear of the hydraulic cylinder 20, plug 12 and the support frame 23. Loading (and unloading) of tube 10 is now very easily achieved. Once loaded, tube 10 is lowered into its original position and end plug 12 is fully inserted therein.

The pressure vessel of this invention is particularly useful as a reactor for carrying out chemical reactions, including polymerization of gaseous and liquid monomers, and polymer processing, requiring elevated pressures and optionally elevated temperatures. Examples of such chemical reactions include, but are by no means limited to: (i) preparation of low density polyethylene and copolymers of ethylene with comonomers such as carbon monoxide, vinyl acetate, acrylates, methacrylates, acrylic acid and the like, wherein ethylene is (co)-polymerized in the presence of free radical catalysts at pressures in excess of about 1,000 atm (100MPa) and temperatures in the region of about 200° C.; (ii) synthesis of ammonia, wherein nitrogen and hydrogen are combined in the presence of a fixed bed iron oxide catalyst promoted with aluminum or potassium oxide, at pressures of about 250 atm (25MPa) and temperatures of about 350° to 400° C. and; (iii) preparation of methanol from synthesis gas, wherein appropriate proportions of carbon monoxide, carbon dioxide and hydrogen are converted to methanol over a fixed bed catalyst such as chromium oxide-zinc oxide or activated copper, at pressures of about 50 to about 300 atm (5 to 30MPa) and temperatures of about 250° to about 350° C.

An example of polymer processing wherein ultrahigh molecular weight polyethylene is subjected to high pressure and temperature in the pressure vessel of the invention to modify its strength properties is provided hereinunder. Although the example illustrates a batch type operation, it will be understood that continuous operations as well as batch operations employing the present pressure vessel are contemplated. An outlet, required for continuous operation, is readily provided by, for example, duplicating inlet 21 in plug 12 at the opposite end of tube 10.

EXAMPLE

In this example, ultrahigh molecular weight polyethylene (UHMWPE) was modified by being subjected to a pressure of 60,000 psig (414MPa) and a temperature of 220° C., using a pressure vessel wherein tube 10 was 7 ft (2.1 m) long and 4 inches (10.2 cm) in diameter. The plug was removed from one end of the tube in about one minute, about 50,000 lbs (222 kN) force being required to overcome the interference fit between the plug and tube wall.

The tube was pivoted clear of the hydraulic cylinder, plug and frame in about 10 sec using an electric chain hoist.

The sample of UHMWPE was inserted by hand into the open end of the tube and the tube was then lowered back into position; this operation required 30 sec.

The plug was fully inserted into the tube in about one minute, requiring about 50,000 lbs (222 kN) force. Total loading time was under 3 minutes.

The vessel was heated to 220° C. in approximately one hour, using 5 gas burners. Temperature was maintained at 220° C. for 2 h and the pressure was then increased to 60,000 psig (414MPa) using high pressure, air-driven piston pumps. Said pressure and temperature were maintained for a further 2 h to complete the desired UHMWPE modification, then reduced to ambient conditions. The plug was removed and the sample was recovered according to the procedure described above.

Those skilled in the art, having the benefit of the teachings of the present invention as hereinabove set forth, can effect numerous modifications thereto. Such modifications are to be construed as being encompassed within the scope of the present invention as set forth in the appended claims.

We claim:

1. A vessel for high pressure processes comprising:
   (i) a tube having a wall of sufficient thickness to withstand a predetermined pressure, the internal cavity of said tube being accessed through a tapered opening at one or both ends, each of said tapered openings having a moveable, cylindrical plug that inserts into said tapered opening, said plug having a plug end tapered to provide an interference fit with said tapered opening, said plug end having a cavity which defines a plug wall, the plug wall having a thickness such that it is flexible under the predetermined pressure and will be forced against said tapered opening as pressure increases;
   (ii) force producing means for moving one or both plug ends into and out of the one or both tapered openings;
   (iii) an external frame to counteract said force producing means; and
   (iv) means for holding said tube stationary during movement of the one or both plug ends.

2. The pressure vessel of claim 1 wherein said tube has tapered openings at both ends and moveable cylindrical plugs that insert into said tapered openings.

3. The pressure vessel of claim 1 wherein said force producing means is a hydraulic cylinder.

4. The pressure vessel of claim 3 wherein said hydraulic cylinder contains a pressure relief valve.

5. The pressure vessel of claim 1 wherein said tapered plug end has "O" ring grooves on its tapered surface.

6. The pressure vessel of claim 1 wherein said means for holding said tube stationary is a stripper plate.

7. The pressure vessel of claim 2 wherein said moveable cylindrical plugs each contain an opening.

8. The pressure vessel of claim 1 further comprising heating means wherein said heating means comprises an open flame directed against an outer surface of said tube.

* * * * *